United States Patent
Stephens, Jr.

(10) Patent No.: US 10,225,591 B2
(45) Date of Patent: Mar. 5, 2019

(54) SYSTEMS AND METHODS FOR CREATING AND MANAGING USER PROFILES

(71) Applicant: COMCAST CABLE COMMUNICATIONS, LLC, Philadelphia, PA (US)

(72) Inventor: James H. Stephens, Jr., Austin, TX (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 7 days.

(21) Appl. No.: 14/519,580

(22) Filed: Oct. 21, 2014

(65) Prior Publication Data

US 2016/0112735 A1 Apr. 21, 2016

(51) Int. Cl.

| | |
|---|---|
| H04N 21/25 | (2011.01) |
| H04N 21/442 | (2011.01) |
| H04N 21/258 | (2011.01) |
| H04N 21/2668 | (2011.01) |
| H04N 21/45 | (2011.01) |
| H04N 21/466 | (2011.01) |
| H04H 60/32 | (2008.01) |
| H04H 60/33 | (2008.01) |
| H04H 60/45 | (2008.01) |
| H04N 21/81 | (2011.01) |

(Continued)

(52) U.S. Cl.
CPC .......... *H04N 21/252* (2013.01); *H04H 60/32* (2013.01); *H04H 60/33* (2013.01); *H04H 60/45* (2013.01); *H04H 60/46* (2013.01); *H04H 60/65* (2013.01); *H04N 21/25891* (2013.01); *H04N 21/2668* (2013.01); *H04N 21/44222* (2013.01); *H04N 21/4532* (2013.01); *H04N 21/466* (2013.01); *H04N 21/812* (2013.01); *H04H 60/372* (2013.01); *H04H 60/40* (2013.01); *H04H 60/43* (2013.01); *H04H 60/47* (2013.01)

(58) Field of Classification Search
CPC ........... H04N 21/252; H04N 21/25891; H04N 21/2668; H04N 21/44222; H04N 21/4532; H04N 21/466; H04H 60/46
See application file for complete search history.

(56) References Cited

U.S. PATENT DOCUMENTS 8,495,680 B2 7/2013 Bentolila et al.
2003/0237094 A1 12/2003 Kurapati et al.
(Continued)

OTHER PUBLICATIONS

Kurapati, K. et al., "Instant Personalization via Clustering TV Viewing Patterns", Proceedings of the 2002 International Association of Science and Technology for Development "Artificial Intelligence and Soft Computing", 2002 ACTA Press, Calgary, AB, Canada (6 pages).

*Primary Examiner* — Hai V Tran
*Assistant Examiner* — Susan X Li
(74) *Attorney, Agent, or Firm* — Ballard Spahr LLP

(57) ABSTRACT

Provided are methods and systems whereby a user device can monitor the attributes of content presented to a plurality of users. The user device can monitor interaction between each of the plurality of users and one or more of the content and the user device. The user device can generate a plurality of profile clusters based on one or more of the monitored attributes and the monitored interactions over a time period. The user device can generate a plurality of user profiles based on the plurality of profile clusters.

24 Claims, 8 Drawing Sheets

(51) Int. Cl.
*H04H 60/37* (2008.01)
*H04H 60/40* (2008.01)
*H04H 60/43* (2008.01)
*H04H 60/47* (2008.01)
*H04H 60/46* (2008.01)
*H04H 60/65* (2008.01)

(56) References Cited

U.S. PATENT DOCUMENTS

| | | |
|---|---|---|
| 2004/0003401 A1 | 1/2004 | Gutta et al. |
| 2004/0043724 A1* | 3/2004 | Weast .................. H04N 5/782 455/3.01 |
| 2006/0092335 A1* | 5/2006 | Strickland ............. H04N 7/163 348/731 |
| 2010/0269134 A1 | 10/2010 | Storan et al. |
| 2012/0079516 A1 | 3/2012 | Phielipp |
| 2012/0102121 A1* | 4/2012 | Wu .................... G06F 17/3071 709/206 |
| 2012/0143911 A1* | 6/2012 | Liebald ............ G06F 17/30702 707/771 |
| 2013/0111509 A1 | 5/2013 | Guo et al. |
| 2014/0280140 A1* | 9/2014 | Ling ................ H04N 21/26283 707/737 |
| 2014/0282717 A1* | 9/2014 | Hutchings .......... H04N 21/2668 725/34 |
| 2015/0020086 A1* | 1/2015 | Chen ................ H04N 21/44218 725/12 |
| 2015/0058884 A1* | 2/2015 | Eldering ................ G06Q 30/02 725/34 |

* cited by examiner

SYSTEMS AND METHODS FOR CREATING AND MANAGING USER PROFILES

BACKGROUND

Consumers have many options when seeking out content. The content options are overwhelming and require that a user traverse an unreasonable amount of unwanted content before locating desired content. These and other shortcomings of the prior art are addressed by the present disclosure.

SUMMARY

It is to be understood that both the following general description and the following detailed description are exemplary and explanatory only and are not restrictive, as claimed. Provided are methods and systems whereby a set-top box or television can create profiles based on user behavior, such as what content a user watches or how loud the user listens to content. For example, if a particular program is frequently watched at a particular time, the set-top box can determine that the program is being watched by the same user or set of users and create a corresponding user profile. In another example, the set-top box can determine that the volume is at or above a first percentage of maximum volume at certain times and below a second percentage of the maximum volume at other times. The set-top box can determine that the same user or set of users watch the content when the volume is at or above the first percentage of the maximum volume and create a corresponding user profile. The set-top box can comprise the content presented when the volume is at or above the first percentage of the maximum volume in the profile. In an aspect, the set-top box can determine that the current viewer or set of ers correspond to an existing profile, and the set-top box can recommend content based on the profile.

Provided are methods and systems whereby a user device can monitor attributes of content presented to a plurality of users. The user device can monitor interaction between each of the plurality of users and one or more of the content and the user device. The user device can generate a plurality of profile clusters based on one or more of the monitored attributes and the monitored interactions over a time period. The user device can generate a plurality of user profiles based on the plurality of profile clusters.

Provided are methods and systems whereby a user device can monitor attributes of content presented to a plurality of users. The user device can monitor interaction between each of the plurality of users and one or more of the content and the user device. The user device can create a plurality of profile clusters based on one or more of the monitored attributes and the monitored interactions over a time period. The user device can create a first user profile linked to a first group of profile clusters of the plurality of profile clusters. The user device can create a second user profile linked to a second group of profile clusters of the plurality of profile clusters.

Provided are methods and systems whereby a user device can monitor attributes of content presented to a plurality of users. The user device can monitor interaction between each of the plurality of users and one or more of the content and the user device. The user device can create a plurality of profile clusters based on one or more of the monitored attributes and the monitored interactions over a time period. The user device can create a user profile by linking two or more of the profile clusters.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
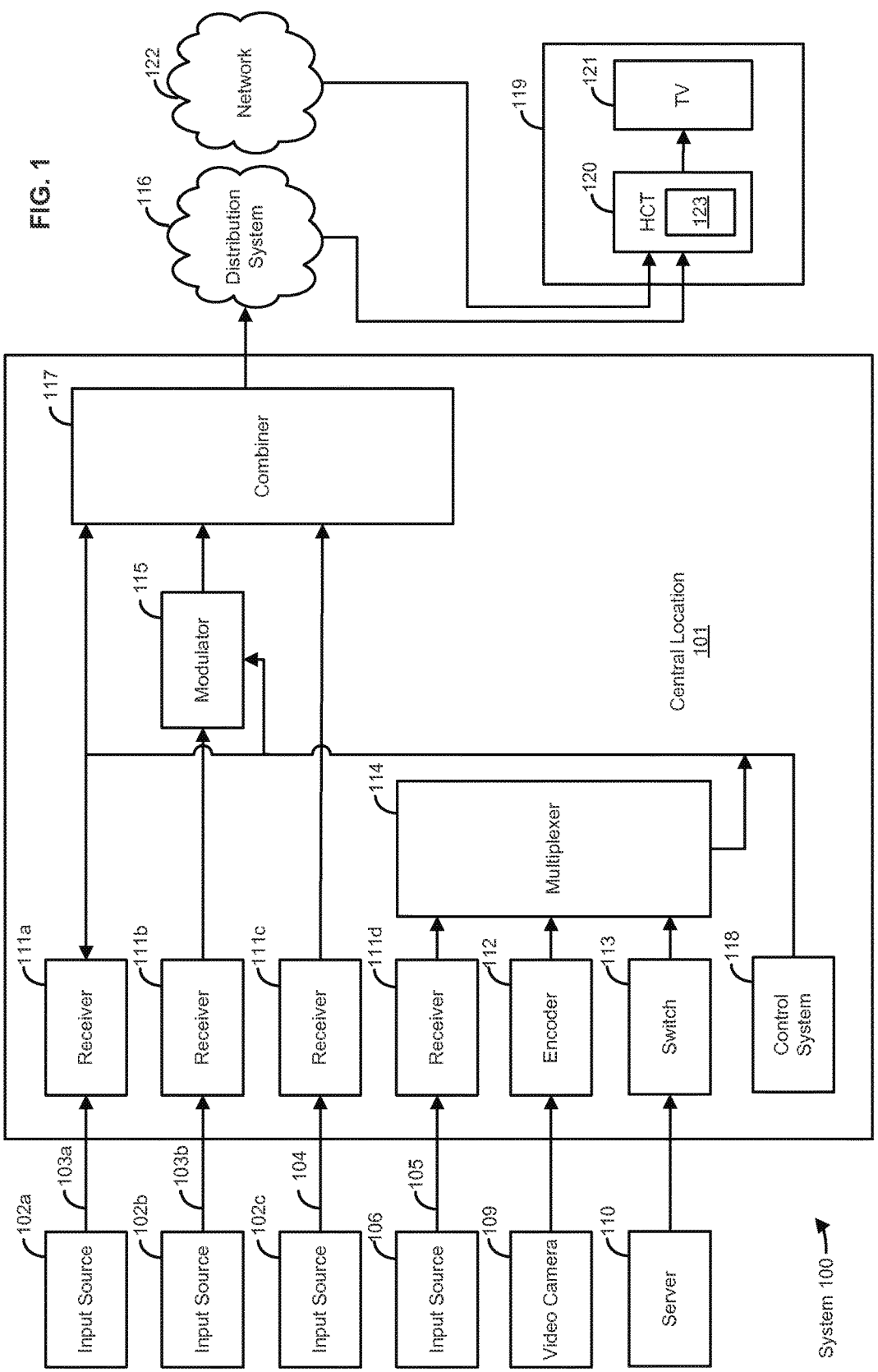
FIG. 1 illustrates an exemplary system.
Figure 2:
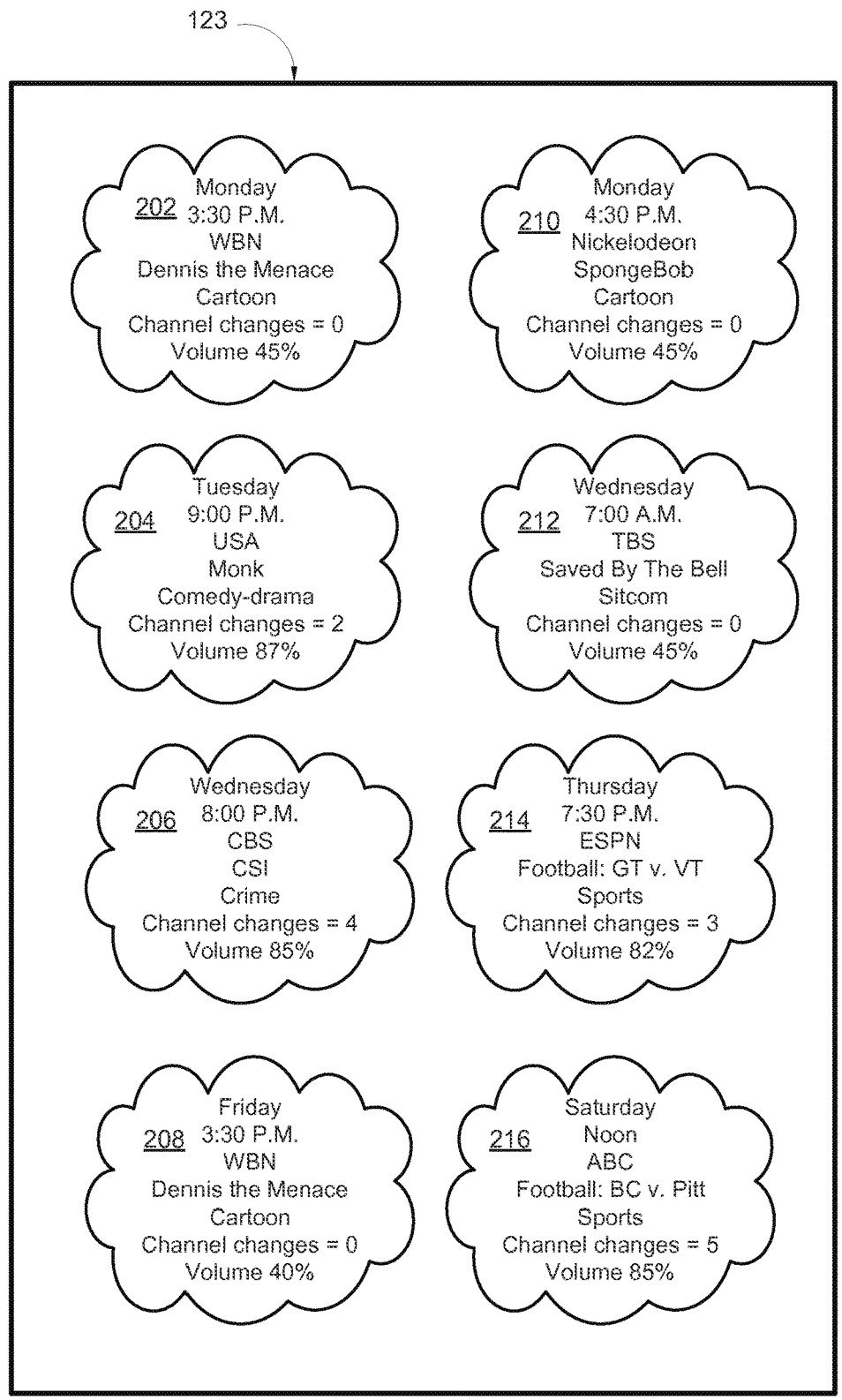
FIG. 2 illustrates an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combination and permutation of these may not be explicitly disclosed, each is specifically contemplated and described herein, for all methods and systems. This applies to all aspects of this application including, but not limited to, steps in disclosed methods. Thus, if there are a variety of additional steps that can be performed, it is understood that each of these additional steps can be performed with any specific embodiment or combination of embodiments of the disclosed methods.

The present methods and systems may be understood more readily by reference to the following detailed description and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses, and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions can also be loaded onto a computer or other programmable data processing apparatus to cause a series of operational steps to be performed on the computer or other programmable apparatus to produce computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The systems and methods of this disclosure can perform passive data collection for viewers of streaming media. A user device can perform passive data collection by monitoring the content currently being presented to the user. For instance, the user device can consider the genre of the program that is being presented to the user and make a record of this information. In an aspect, the user device can make a record indicating that a user is watching football at noon on a Saturday. The user device can perform passive data collection which can include an interaction between a user and the content currently being presented to the user. For instance, the user device can consider the number of times a user changes channels while watching the current program. In an aspect, the user device can make a record indicating that the user turned the channel about an hour and twenty minutes into the game and returned about an hour and forty minutes into the game. The user device can perform passive data collection which can include an interaction between the user and the user device. For instance, the user device can consider the audio volume at which the content is presented to the user and make a record of this information. In an aspect, the system can consider that audio associated with the game is played at 82% of the maximum volume.

The data collected during a time period can be used to generate a profile cluster. Clustering can comprise analyzing a set of objects (content, interactions with content, and the like), measuring similarity between the set of objects, and grouping similar objects together to form clusters. Cluster analysis groups objects (observations, events) based on the information found in the data describing the objects or their relationships. The goal is that the objects in a group (cluster) will be similar (or related) to one other and different from (or unrelated to) the objects in other groups (clusters). The greater the similarity (or homogeneity) within a group (cluster), and the greater the difference between groups (clusters), the "better" or more distinct the clustering. In an aspect, the data can be analyzed by a clustering algorithm. For example, the clustering algorithm can scale the data and can use heuristics to estimate the number of clusters. K-means clustering can be applied to the data (before or after scaling). The generated clusters can then be evaluated for quality. Additionally, the most popular programs for each cluster can be computed. Other clustering algorithms can be used. Later, when a service is asked to make a recommendation for a current user, the most recent data can be obtained and processed as above. Then the previously obtained clustering can be applied to the most recent data to generate a measure of the likelihood that the current user's preferences correspond to each cluster. If a single cluster closely matches the current user's behavior, then that cluster can inform recommendations for that user.

For example, clustering of data might find four clusters: 1. Sports content on weekend afternoons; 2. Cartoons on Saturday mornings; 3. Crime dramas; and 4. News programming. A user whose data closely fits profile #2 should not get recommendations tailored for profile #3. Note that a single user might have multiple profiles: Sports on the weekend versus weekday sitcoms.

In an aspect, the user device can create a profile cluster based on a user watching football, turning the channel one time, and listening to the audio at 82% of the maximum volume. After the user device generates a plurality of profile clusters, the user device can generate user profiles based on the profile clusters. For instance, the user device can determine that one user watches programs above a certain threshold audio volume and can associate the profile clusters that contain an audio volume above the threshold with the user's user profile. In an aspect, profile clusters with the same or similar information: football, one-twenty minute channel change about mid-way through a three hour program, and/or setting audio at 82% of the maximum volume can be linked to form a user profile. After the user device generates a plurality of user profiles, the user device can associate one of the user profiles with a current viewer. In an aspect, the user device can determine that the audio was recently adjusted up to 82% of the maximum volume and that the user is watching a football game and associate the current user with the user profile discussed above. The user device can present supplemental content to the current user based on the associated user profile. For instance, the user device can detect that the current user is channel surfing and suggest content based on the user profile. In an aspect, after a football game, the user may begin rapidly changing channels or invoke an electronic program guide. The user device can detect that the user is searching for content and suggest another football game that is about to kick-off.

FIG. 1 illustrates various aspects of an exemplary system in which the present methods and systems can operate. The present disclosure relates to passively creating user profiles based on the content presented and user interaction. User interaction can be both user interaction with the content and with a user device. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing with the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of system 100. The control system 118 can interface with, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a display device, such as on a television set (TV) 121 or a computer monitor. Those skilled in the art will appreciate that the signal can be decoded in a variety of equipment, including an HCT, a computer, a TV, a monitor, or satellite dish. In an exemplary aspect, the methods and systems disclosed can be located within, or performed on, one or more HCT's 120, TV's 121, central locations 101, DVR's, home theater PC's, and the like.

In an aspect, user location 119 is not fixed. By way of example, a user can receive content from the distribution system 116 on a mobile device such as a laptop computer, PDA, smartphone, GPS, vehicle entertainment system, portable media player, and the like.

In an aspect, HCT 120 can be in communication with a network 122, such as a local area network (LAN) and/or a general wide area network (WAN)

In an exemplary aspect, the methods and systems disclosed herein can be located within one or more HCT 120. In an exemplary aspect, the methods and systems disclosed herein can be performed by logic 123 stored in an HCT 120. The logic 123 stored in the HCT 120 can create a plurality of profile clusters and link profile clusters into user profiles. Any clustering algorithm can be used. In an aspect, content can be provided to the HCT 120 for presentation at the user location 119 via the distribution system 116. In an aspect, content can be provided to the HCT 120 for presentation at the user location 119 via the network 122. In an aspect, the logic 123 stored in the HCT 120 can monitor a plurality of attributes associated with the content. In an aspect, the logic 123 can monitor a plurality of interactions between a user and the HCT 120. In an aspect, the logic 123 can monitor a plurality of interactions between a user and the content. In an aspect, the logic 123 can form a plurality of profile clusters based on the monitored attributes. In an aspect, the logic 123 can form a plurality of profile clusters based on the monitored interactions between the user and the HCT 120. In an aspect, the logic 123 can form a plurality of profile clusters based on the monitored interactions between the user and the content. In an aspect, the logic 123 can form a plurality of user profiles based on the plurality of profile clusters. In an aspect, the logic 123 can associate a current user with one of the plurality of user profiles. In an aspect, the logic 123 can suggest content to be presented at user location 119 based on the associated user profile. For example, the logic 123 can monitor currently consumed content and/or interactions and perform cluster analysis to determine similarity between previously determined user profiles and current data. The user profile that is most similar to the current data can be used for content suggestion. In aspect, a current profile cluster can be generated based on the current data and a similarity between the current profile cluster and previously determined profile clusters can be determined. For example, the Davies-Bouldin index, the Dunn index, Rand measure, F-measure, Jaccard index, and the like can be used to determine similarities between the current profile cluster and the previously determined profile clusters. The previously determined profile cluster (and associated user profile) with the closest similarity to the current profile cluster can be used to suggest content to the user.

Turning now to FIG. 24, diagrams of an exemplary embodiment of logic 123 are illustrated. Logic 123 can comprise a plurality of entries 202-216. Each entry 202-216 can comprise a plurality of attributes. In an aspect, an entry can represent a program displayed in content. In an aspect, an entry can represent a time. In an aspect, an entry can represent a program displayed in content at a particular time or in a particular time range. In a further aspect, the plurality of attributes can comprise a plurality of attributes of the program displayed in content at the particular time or time range. In a further aspect, the plurality of attributes of the program can comprise one or more of a program title, a program start time, a program end time, a program run time, a program genre, a program subgenre, a program parental rating, a program critical rating, a list of cast, a list of crew, a director, a producer, a production company, a distribution company, a sport, a league, an association, a team, a player, a sponsor, a channel, a day of the week, a date, a language, a plurality of information related to audio, including a soundtrack, a plurality of artists, a plurality of songs, and the like. In an aspect, the plurality of attributes can comprise a plurality of conditions of a device at a particular time or a particular time range. In a further aspect, the plurality of conditions of the device can be a plurality of settings of the device. In a further aspect, the plurality of settings can comprise a tuned channel, an audio volume level, and the like. In an aspect, the plurality of attributes can comprise a plurality of attributes related to interaction between a user and a device at a particular time or a particular time range. In a further aspect, the plurality of attributes related to interaction between the user and the device can be a plurality of adjustments made to settings on the device. In a further aspect, the plurality of adjustments made to settings on the device can comprise an audio volume change rate, a channel change rate, a measurement of pressure applied when a user-engageable element of the device is engaged and the like. In an aspect, the plurality of attributes can comprise a plurality of information related to interaction between a user and a program. In a further aspect, a plurality of information related to interaction between a user and a program can comprise an audio volume change rate, an audio volume change count, a channel change rate, a channel change count, a total time representing the time a display device displayed the program, a total time representing the time of the program that a display device did not display the program (in other words, the amount of time that the program was running that the display device was tuned to a different channel), and the like. In an aspect, a plurality of attributes can comprise any combination of attributes discussed above.

In an aspect, a time range can begin at a program start time, when a device is powered on, when a device tunes to a channel, and the like. In an aspect, the time range can end at a program end time, when the device is powered off, when the device no longer tunes to the channel, and the like.

In an example, the logic 123 can monitor and make a record of attributes of content and create entries 202-216 based on a plurality of attributes monitored and made of record. For example, logic 123 can monitor content delivered to a set-top box. In an aspect, a title of the content can be monitored and made of record. For instance, an entry 202 can comprise an attribute that content delivered to the set-top box had a title of "Dennis the Menace." In an aspect, a genre of program can be monitored and made of record. For instance, an entry 202 can comprise an attribute of a genre of "Cartoon." In an aspect, a program start time can be monitored and made of record. For instance, an entry 202 can comprise an attribute of a start time of 3:30 P.M. In an aspect, a program day of the week can be monitored and made of record. For instance, an entry 202 can comprise an attribute of "Monday."

In an example, the logic 123 can monitor and make a record of attributes of a device used to deliver content and create entries 202-216 based on the attributes monitored and made of record. For example, logic 123 can monitor and make an attribute of a tuned channel on a set-top box. For instance, an entry 202 can comprise an attribute that the set-top box is tuned to WBN. In an aspect, an audio volume of the set-top box can be monitored and made of record. For instance, an entry 202 can comprise an attribute of an audio volume of 45%.

In an example, the logic 123 can monitor and make a record of attributes of interaction between a user, content, and a device used to deliver content, and create entries 202-216 based on the attributes monitored and made of record. For example, logic 123 can monitor and make a record of how many times a user changes channels during a program. For instance, an entry 202 can comprise an attribute of a channel changes total of "0."

Figure 3:
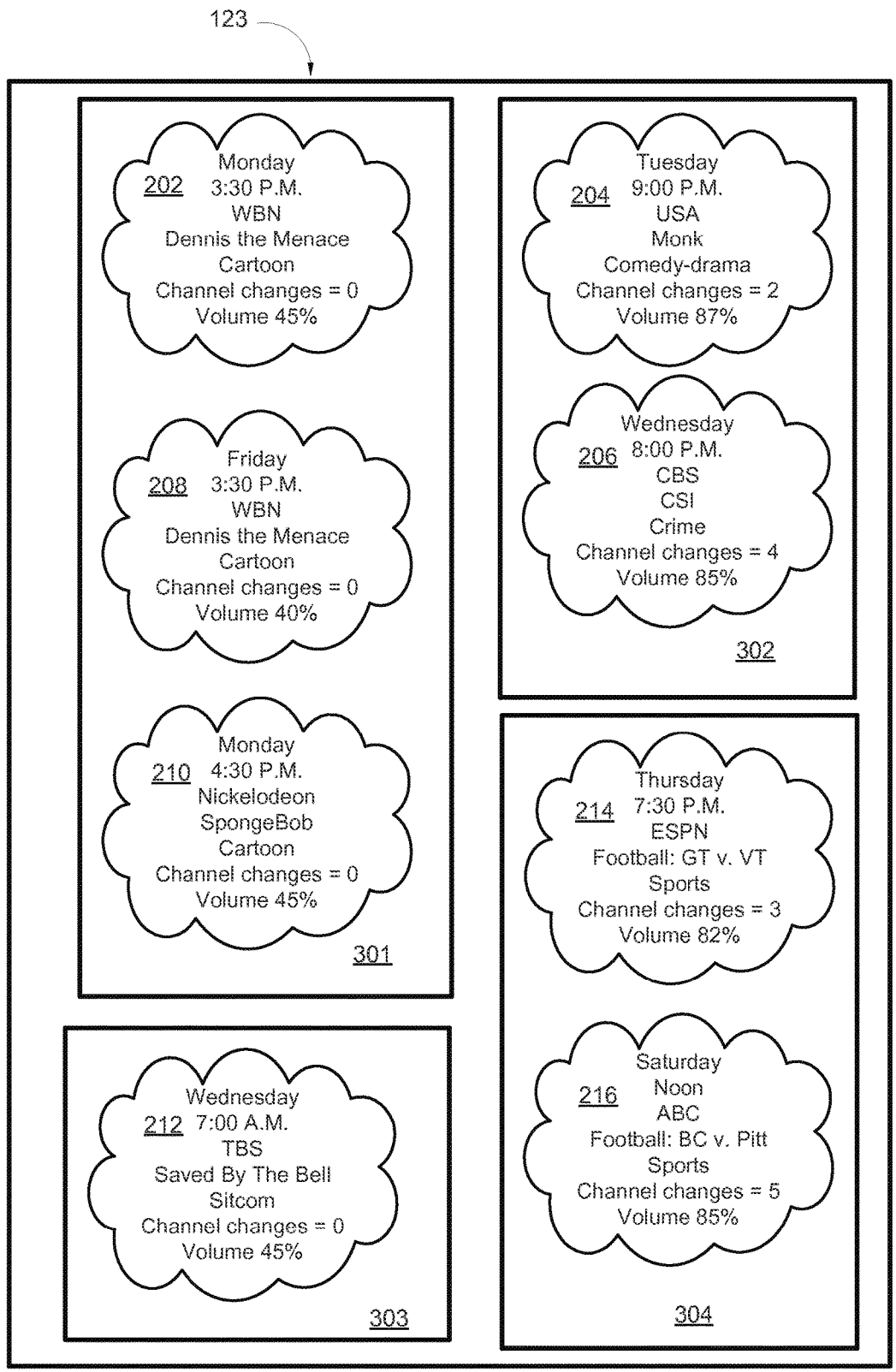
FIG. 3 illustrates an exemplary system.

Turning now to FIG. 3, the logic 123 can group the entries 202-216 into profile clusters 301-304, based on one or more of the plurality of the attributes of the entries 202-216. For instance, a profile cluster 301 can group together the entries 202, 208, and 210 based on program characteristics (such as, cartoon programs, weekday afternoon start times, etc.), viewing characteristics (such as, no channel changes, a relatively low and consistent audio volume level, etc.), or any combination of the forgoing. For instance, a profile cluster 302 can group entries 204 and 206 together based on one or more of the following attributes: program characteristics (such as, crime dramas, weeknight start times, etc.), viewing characteristics (such as, some channel changes, a relatively high and consistent audio volume level, etc.), or any combination of the forgoing. For instance, a profile cluster 303 can group entry 212 based on one or more of the following attributes: program characteristics (such as, sitcoms, weekday morning start times, etc.), viewing characteristics (such as, no channel changes, a relatively low and consistent audio volume level, etc.), or any combination of the forgoing. For instance, a profile cluster 304 can group entries 214 and 216 based on one or more of the following attributes: program characteristics (such as, sporting events, football games, college football games, intraconference football games, etc.), viewing characteristics (such as, some channel changes, a relatively high and consistent audio volume level, etc.), or any combination of the forgoing. In an aspect, a profile cluster 301-304 can link one or more of a plurality of entries 202-216 based on a comparison of a set of profile clusters in a central location and the entries associated with the set of profile clusters. In an aspect, a central location can comprise a remote server comprising a database. In an aspect, the database can store the entries associated with the set of profile clusters. The entries of the stored set of profile clusters can be used in grouping entries 202-216 into profile clusters 301-304.

Figure 4:
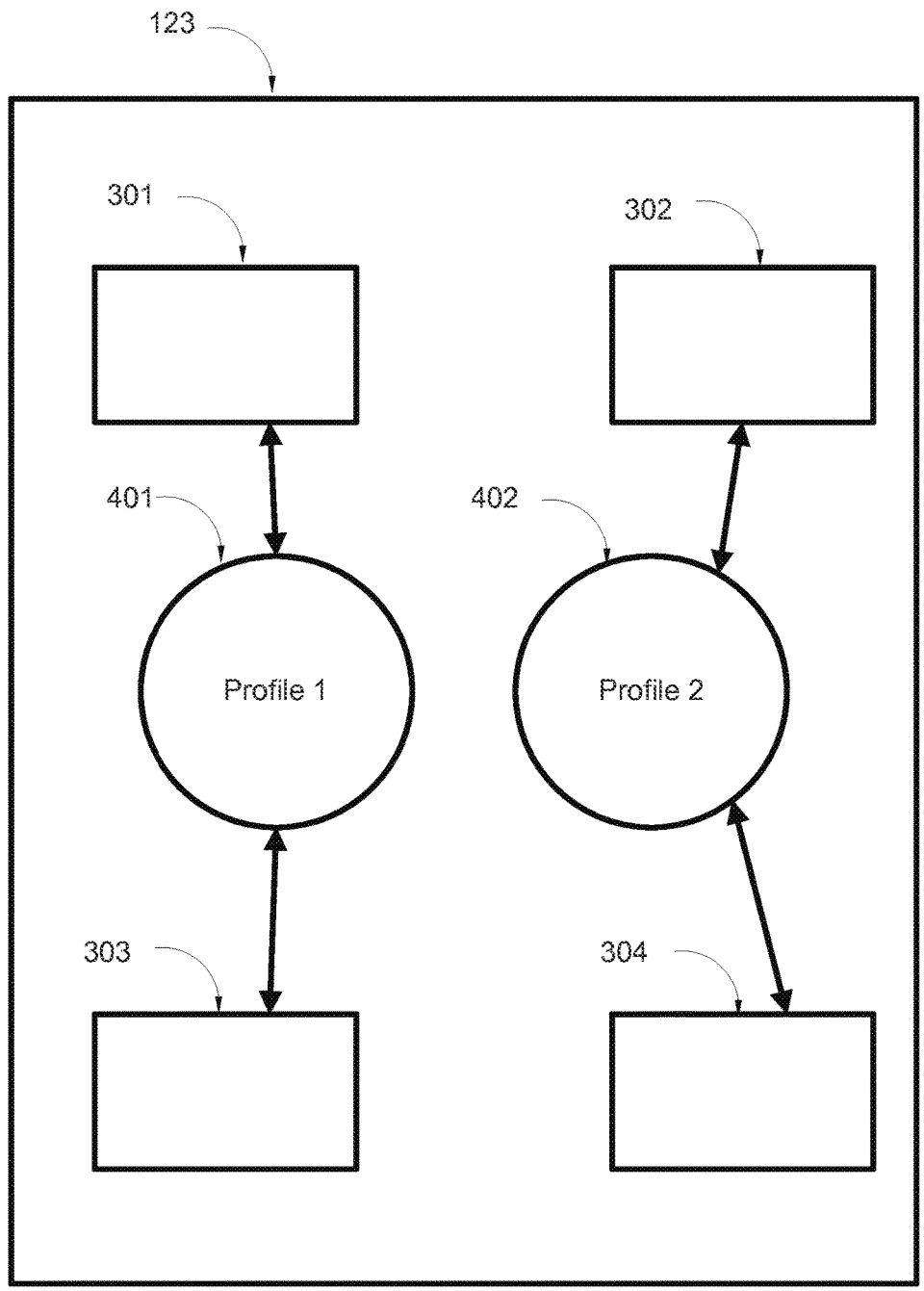
FIG. 4 illustrates an exemplary system.

Turning now to FIG. 4, the logic 123 can create profiles 401, 402, based on one or more of the plurality of profile clusters 301-304. For instance, a profile 401 can be created based on characteristics of profile clusters 301, 303, such as program characteristics (such as, children programs, viewing times outside of typical school hours, etc.), viewing characteristics (such as, no channel changes, a relatively low and consistent audio volume level, etc.), or any combination of the foregoing. For instance, a profile 402 can be created based on characteristics of profile clusters 302, 304, such as program characteristics (such as, adult programs, viewing times outside of typical working hours, etc.), viewing characteristics (such as, some channel changes, a relatively high and consistent audio volume level, etc.), or any combination of the forgoing. In an aspect, a profile 401, 402 can link one or more of a plurality of profile clusters 301-304 based on a comparison of a set of profiles in a central location and the profile clusters associated with the set of profiles. In an aspect, a central location can comprise a remote server comprising a database. In an aspect, the database can store the profile clusters associated with the set of profiles. The profile clusters of the stored set of profiles can be used in creating profiles 401-402 from profile clusters 301-304.

Figure 5:
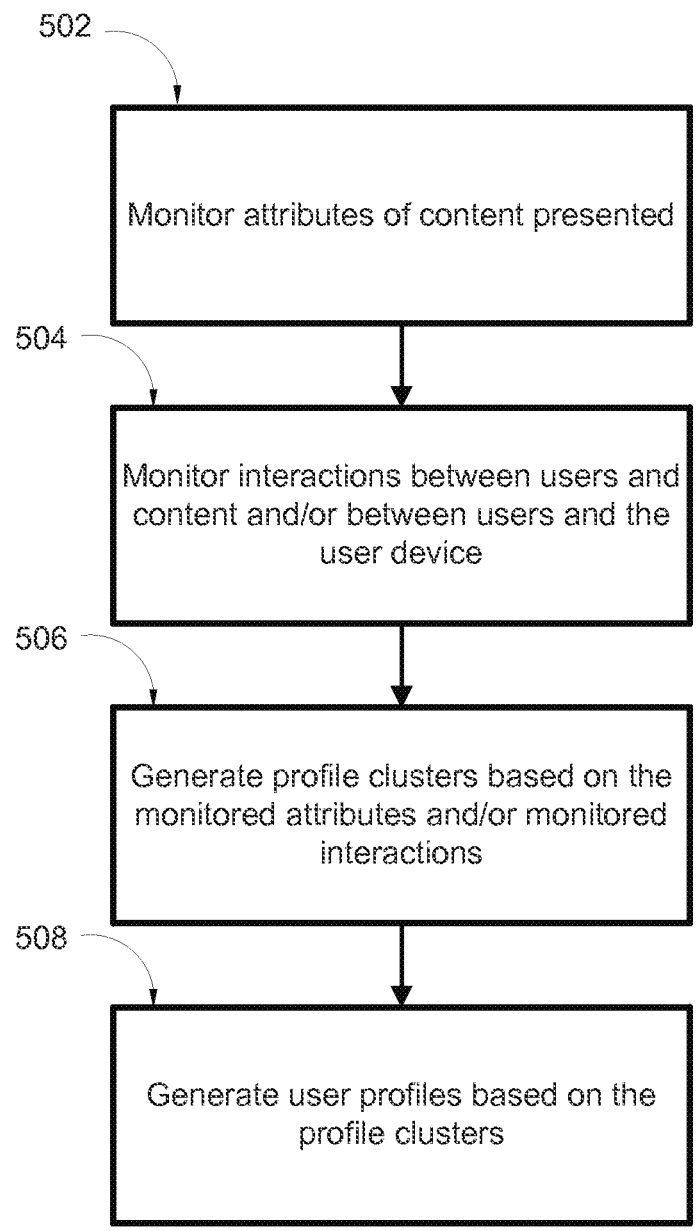
FIG. 5 illustrates an exemplary embodiment of a flow diagram of a process performed by a user device.

In an aspect, provided are methods for creating a plurality of user profiles based on content. An exemplary method is shown in FIG. 5. In step 502, a plurality of attributes associated with content presented to a plurality of users on a user device can be monitored. A user device can be a television, monitor, phone, tablet, screen, display, speakers, headphones, or the like. Monitoring a plurality of attributes associated with content can be accomplished through one or more of extracting metadata associated with the content, extracting electronic programming guide (EPG) information associated with the content, software for extracting data from the content, or the like. Software for extracting data from the content can comprise facial recognition software, voice recognition software, or the like.

In step 504, a plurality of interactions between each of the plurality of users and one or more of the content and the user device can be monitored. An interaction between a user and content can be one or more of: an audio volume change rate, an audio volume change count, a channel change rate, a channel change count, a total time representing the time a display device displayed the program, a total time representing the time of the program that a display device did not display the program, a total time representing the time of the program that a display device displayed the program in the foreground, a total time representing the time of the program that a display device displayed the program in the background, a total time represent the time of the program that a display device had a focus on the program, a total time represent the time of the program that a display device did not have a focus on the program, a count of the times that the program leaves the foreground of the device, a count of the times that the program does not have a focus of the display, a total time a user-selectable element is in range of the program, a count of the times a user-selectable element is in range of the program, a number of clicks, and the like. An interaction between a user and a user device can be one or more of: a website presented, a tuned channel, an audio volume level, an audio volume change rate, a channel change rate, a content change rate, a click through rate, a measurement of pressure applied when a user-engageable element of the device is engaged, and the like. An interaction between a user and a user device can overlap with an interaction between a user and content. For example, a content change rate can represent a user's interaction with the user device and a user's interaction with the content. The methods described herein need not make a determination of whether an interaction observed is between a user and a user device or a user and content.

In step 506, a plurality of profile clusters can be generated. In an aspect, the plurality of profile clusters can be based on the attributes monitored in step 502. In an aspect, a set of observed profile clusters can be maintained in a central location. In a further aspect, the plurality of profile clusters can be based on a linking of the attributes monitored in step 502 with the set of observed profile clusters. In an aspect, the plurality of profile clusters can be based on the interactions monitored in step 504. In an aspect, the plurality of profile clusters can be based on a linking of the interactions monitored in step 504 with the set of observed profile clusters. In an aspect, the plurality of profile clusters can be based on any combination of the bases mentioned in this paragraph.

In step 508, a plurality of user profiles can be generated. The plurality of user profiles can be based on the profile clusters generated in step 506. In an aspect, the plurality of user profiles can be based on the attributes monitored in step 502 of the profile clusters generated in step 506. In an aspect, a set of observed user profiles can be maintained in a central location. In a further aspect, the plurality of user profiles can be based on a linking of attributes monitored in step 502 of the profile clusters generated in step 506 with the set of observed user profiles. In an aspect, the plurality of profile clusters can be based on the interactions monitored in step 504 of the profile clusters generated in step 506. In an aspect, the plurality of profile clusters can be based on a linking the interactions monitored in step 504 of the profile clusters generated in step 506 with the set of observed user profiles. In an aspect, the plurality of profile clusters can be based on any combination of the bases mentioned in this paragraph.

Optionally, a current user can be associated with one of the plurality of user profiles generated in step 508. Association of a current user with one of the plurality of user profiles can comprise monitoring a plurality of attributes of the content currently presented. In an aspect, monitoring a plurality of attributes of content can comprise any, all, or a combination of the methods of monitoring attributes of content previously disclosed. Association of a current user with one of the plurality of user profiles can comprise monitoring a plurality of interactions between the current user and a user device. In an aspect, monitoring a plurality of interactions between the current user and a user device can comprise any, all, or a combination of the methods of monitoring interactions between users and user devices previously disclosed. Association of a current user with one of the plurality of user profiles can comprise monitoring; a plurality of interactions between the current user and content. In an aspect, monitoring a plurality of interactions between the current user and content can comprise any, all, or a combination of the methods of monitoring interactions between users and content previously disclosed. Association of a current user with one of the plurality of user profiles can comprise the current user selecting one of the plurality of user profiles. In aspect, association of a current user with one of the plurality of user profiles can comprise generating a current profile based on currently monitored attributes and a similarity between the current profile cluster and the previously determined plurality of profile clusters can be determined. For example, the Davies-Bouldin index, the Dunn index, Rand measure, F-measure, Jaccard index, and the like can be used to determine similarities between the current profile cluster and the previously determined profile clusters. The previously determined profile cluster (and associated user profile) with the closest similarity to the current profile cluster can be used to suggest content to the user. In an aspect, association of a current user with one of the plurality of user profiles can be based on any combination of the bases mentioned in this paragraph.

Optionally, supplemental content can be presented to the current user based on the associated user profile. In an aspect, the supplemental content can be an advertisement, a commercial, suggested content, or the like. In an aspect, the supplemental content can be presented simultaneously with the content. In a further aspect, the supplemental content can be presented as an overlay in the content. In an aspect, the supplemental content can be presented in a different viewing area than a viewing area for the content. In an aspect, the supplemental content can be spliced together with the content. In an aspect, the supplemental content can be presented in a predetermined window. In an aspect, the supplemental content can be presented in real-time. In an aspect, the supplemental content can be available on demand.

Figure 6:
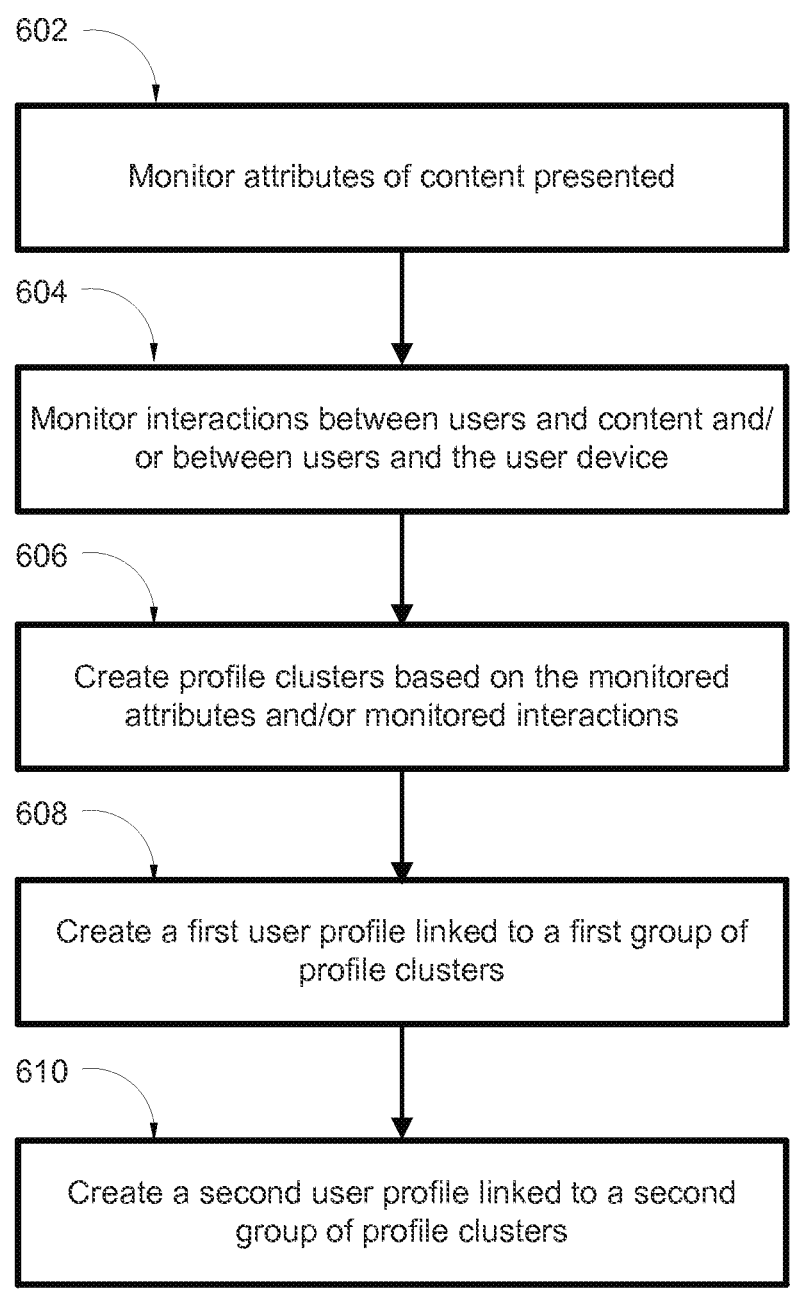
FIG. 6 illustrates another exemplary embodiment of a flow diagram of a process performed by a user device.

In an aspect, provided are methods for creating a plurality of user profiles based on content. An exemplary method is shown in FIG. 6. In step 602, a plurality of attributes associated with content presented to a plurality of users on a user device can be monitored. A user device can be a television, monitor, phone, tablet, screen, display, speakers, headphones, or the like. Monitoring a plurality of attributes associated with content can be accomplished through one or more of: extracting metadata associated with the content, extracting electronic programming guide (EPG) information associated with the content, software for extracting data from the content, or the like. Software for extracting data from the content can comprise facial recognition software, voice recognition software, or the like.

In step 604, a plurality of interactions between each of the plurality of users and one or more of the content and the user device can be monitored. An interaction between a user and content can be one or more of: an audio volume change rate, an audio volume change count, a channel change rate, a channel change count, a total time representing the time a display device displayed the program, a total time representing the time of the program that a display device did not display the program, a total time representing the time of the program that a display device displayed the program in the foreground, a total time representing the time of the program that a display device displayed the program in the background, a total time represent the time of the program that a display device had a focus on the program, a total time represent the time of the program that a display device did not have a focus on the program, a count of the times that the program leaves the foreground of the device, a count of the times that the program does not have a focus of the display, a total time a user-selectable element is in range of the program, a count of the times a user-selectable element is in range of the program, a number of clicks, and the like. An interaction between a user and a user device can be one or more of: a website presented, a tuned channel, an audio volume level, an audio volume change rate, a channel change rate, a content change rate, a click through rate, a measurement of pressure applied when a user-engageable element of the device is engage, and the like. An interaction between a user and a user device can overlap with an interaction between a user and content. For example, a content change rate can represent a user's interaction with the user device and a user's interaction with the content. The methods described herein need not make a determination of whether an interaction observed is between a user and a user device or a user and content.

In step 606, a plurality of profile clusters can be created. In an aspect, the plurality of profile clusters can be based on the attributes monitored in step 602. In an aspect, a set of observed profile clusters can be maintained in a central location. In an aspect, the plurality of profile clusters can be based on a linking of the attributes monitored in step 602 with the set of observed profile clusters. In an aspect, the plurality of profile clusters can be based on the interactions monitored in step 604. In an aspect, the plurality of profile dusters can be based on a linking of the interactions monitored in step 604 with the set of observed profile clusters. In an aspect, the plurality of profile clusters can be based on any combination of the bases mentioned in this paragraph.

In step 608, a first user profile can be linked to a first group of profile clusters created in step 606. In an aspect, the first group of profile clusters can be linked to the first user profile based on the attributes monitored in step 602 of the profile clusters created in step 606. In an aspect, a set of observed user profiles can be maintained in a central location. In an aspect, the first group of profile clusters can be linked to the first user profile based on a linking of attributes monitored in step 602 of the profile clusters created in step 606 with the set of observed user profiles. In an aspect, the first group of profile clusters can be linked to the first user profile based on the interactions monitored in step 604 of the profile clusters created in step 606. In an aspect, the first group of profile clusters can be linked to the first user profile based on a linking the interactions monitored in step 604 of the profile clusters created in step 606 with the set of observed user profiles. In an aspect, the first group of profile clusters can be linked to the first user profile based on any combination of the bases mentioned in this paragraph.

In step 610, a second user profile can be linked to a second group of profile clusters created in step 606. In an aspect, the second group of profile clusters can be linked to the second user profile based on the attributes monitored in step 602 of the profile clusters created in step 606. In an aspect, a set of observed user profiles can be maintained in a central location. In an aspect, the second group of profile clusters can be linked to the second user profile based on a linking of attributes monitored in step 602 of the profile clusters created in step 606 with the set of observed user profiles. In an aspect, the second group of profile clusters can be linked to the second user profile based on the interactions monitored in step 604 of the profile clusters created in step 606. In an aspect, the second group of profile clusters can be linked to the second user profile based on a linking the interactions monitored in step 604 of the profile clusters created in step 606 with the set of observed user profiles. In an aspect, the second group of profile clusters can be linked to the second user profile based on any combination of the bases mentioned in this paragraph.

Optionally, a current user can be associated with the first user profile created in step 608. Association of a current user with the first profile can comprise monitoring a plurality of attributes of the content currently presented. In an aspect, monitoring a plurality of attributes of content can comprise any, all, or a combination of the methods of monitoring attributes of content previously disclosed. Association of a current user with the first user profile can comprise monitoring a plurality of interactions between the current user and a user device. In an aspect, monitoring a plurality of interactions between the current user and a user device can comprise any, all, or a combination of the methods of monitoring interactions between users and user devices previously disclosed. Association of a current user with the first user profile can comprise monitoring a plurality of interactions between the current user and content. In an aspect, monitoring a plurality of interactions between the current user and content can comprise any, all, or a combination of the methods of monitoring interactions between users and content previously disclosed. Association of a current user with the first user profile can comprise the current user selecting the first profile. In aspect, association of a current user with one of the plurality of user profiles can comprise generating a current profile based on currently monitored attributes and a similarity between the current profile cluster and the previously determined plurality of profile clusters can be determined. For example, the Davies-Bouldin index, the Dunn index, Rand measure, F-measure, Jaccard index, and the like can be used to determine similarities between the current profile cluster and the previously determined profile clusters. The previously determined profile cluster (and associated user profile) with the closest similarity to the current profile cluster can be used to suggest content to the user. In an aspect, association of a current user with the first user profile can be based on any combination of the bases mentioned in this paragraph.

Optionally, supplemental content can be presented to the current user based on the associated user profile. In an aspect, the supplemental content can be an advertisement, a commercial, suggested content, or the like. In an aspect, the supplemental content can be presented simultaneously with the content. In a further aspect, the supplemental content can be presented as an overlay in the content. In an aspect, the supplemental content can be presented in a different viewing area than a viewing area for the content. In an aspect, the supplemental content can be spliced together with the content. In an aspect, the supplemental content can be presented in a predetermined window. In an aspect, the supplemental content can be presented in real-time. In an aspect, the supplemental content can be available on demand.

Figure 7:
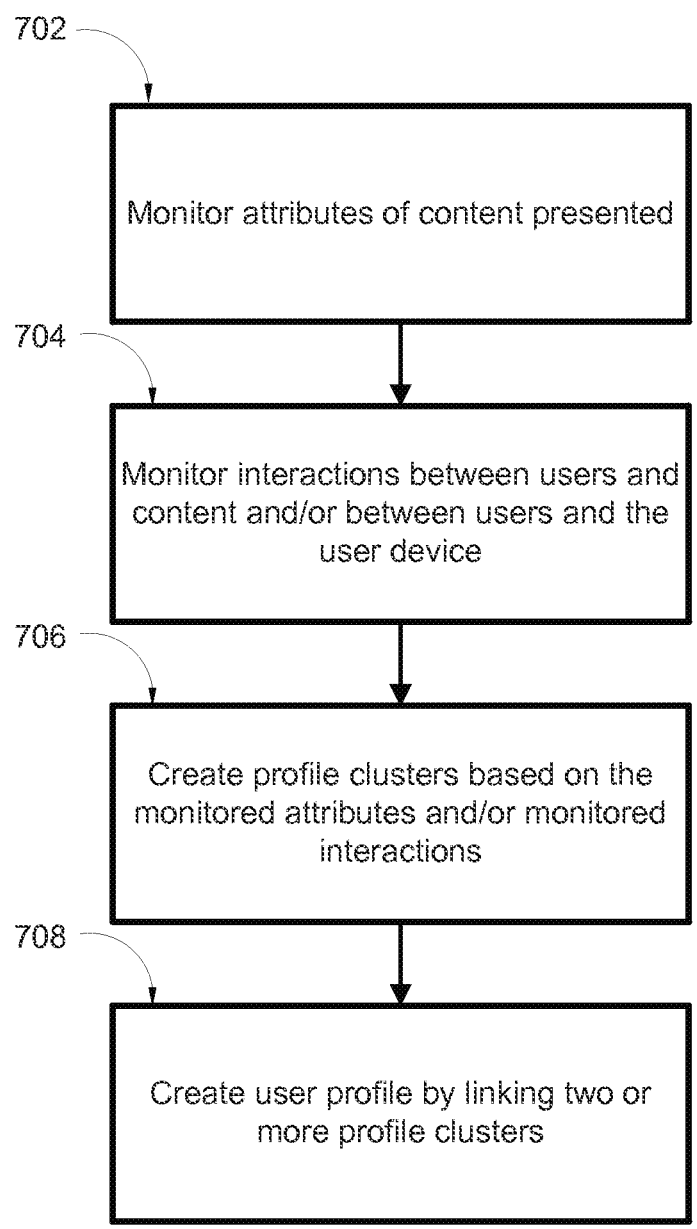
FIG. 7 is illustrates another exemplary embodiment of a flow diagram of a process performed by a user device.

In an aspect, provided are methods for creating a plurality of user profiles based on content. An exemplary method is shown in FIG. 7. In step 702, a plurality of attributes associated with content presented to a plurality of users on a user device can be monitored. A user device can be a television, monitor, phone, tablet, screen, display, speakers, headphones, or the like. Monitoring a plurality of attributes associated with content can be accomplished through one or more of: extracting metadata associated with the content, extracting electronic programming guide (EPG) information associated with the content, software for extracting data from the content, or the like. Software for extracting data from the content can comprise facial recognition software, voice recognition software, or the like.

In step 704, a plurality of interactions between each of the plurality of users and one or more of the content and the user device can be monitored. An interaction between a user and content can be one or more of: an audio volume change rate, an audio volume change count, a channel change rate, a channel change count, a total time representing the time a display device displayed the program, a total time representing the time of the program that a display device did not display the program, a total time representing the time of the program that a display device displayed the program in the foreground, a total time representing the time of the program that a display device displayed the program in the background, a total time represent the time of the program that a display device had a focus on the program, a total time represent the time of the program that a display device did not have a focus on the program, a count of the times that the program leaves the foreground of the device, a count of the times that the program does not have a focus of the display, a total time a user-selectable element is in range of the program, a count of the times a user-selectable element is in range of the program, a number of clicks, and the like. An interaction between a user and a user device can be one or more of: a website presented, a tuned channel, an audio volume level, an audio volume change rate, a channel change rate, a content change rate, a click through rate, a measurement of pressure applied when a user-engageable element of the device is engaged, and the like. An interaction between a user and a user device can overlap with an interaction between a user and content. For example, a content change rate can represent a user's interaction with the user device and a user's interaction with the content. The methods described herein need not make a determination of whether an interaction observed is between a user and a user device or a user and content.

In step 706, a plurality of profile clusters can be created. In an aspect, the plurality of profile clusters can be based on the attributes monitored in step 702. In an aspect, a set of observed profile clusters can be maintained in a central location. In an aspect, the plurality of profile clusters can be based on a linking of the attributes monitored in step 702 with the set of observed profile clusters. In an aspect, the plurality of profile clusters can be based on the interactions monitored in step 704. In an aspect, the plurality of profile clusters can be based on a linking of the interactions monitored in step 704 with the set of observed profile clusters. In an aspect, the plurality of profile clusters can be based on any combination of the bases mentioned in this paragraph.

In step 708, a user profile can be created by linking two or more profile clusters created in step 706. In an aspect, linking two or more profile clusters can be based on the attributes monitored in step 702 of the profile clusters created in step 706. In an aspect, a set of observed user profiles can be maintained in a central location. In an aspect, linking two or more profile clusters can be based on a linking of attributes monitored in step 702 of the profile clusters created in step 706 with the set of observed user profiles. In an aspect, linking two or more profile clusters can be based on the interactions monitored in step 704 of the profile clusters created in step 706. In an aspect, linking two or more profile clusters can be based on a linking the interactions monitored in step 704 of the profile clusters created in step 706 with the set of observed user profiles. In an aspect, linking two or more profile clusters can be based on any combination of the bases mentioned in this paragraph.

Optionally, a current user can be associated with the user profile created in step 708. Association of a current user with the user profile can comprise monitoring a plurality of attributes of the content currently presented. In an aspect, monitoring a plurality of attributes of content can comprise any, all, or a combination of the methods of monitoring attributes of content previously disclosed. Association of a current user with the user profile can comprise monitoring a plurality of interactions between the current user and a user device. In an aspect, monitoring a plurality of interactions between the current user and a user device can comprise any, all, or a combination of the methods of monitoring interactions between users and user devices previously disclosed. Association of a current user with the user profile can comprise monitoring a plurality of interactions between the current user and content. In an aspect, monitoring a plurality of interactions between the current user and content can comprise any, all, or a combination of the methods of monitoring interactions between users and content previously disclosed. Association of a current user with the user profile can comprise the current user selecting the user profile. In aspect, association of a current user with the user profile can comprise generating a current profile based on currently monitored attributes and a similarity between the current profile cluster and the previously determined plurality of profile clusters that are linked to the user profile can be determined. For example, the Davies-Bouldin index, the Dunn index, Rand measure, F-measure, Jaccard index, and the like can be used to determine similarities between the current profile cluster and the previously determined profile clusters that are linked to the user profile. If the previously determined profile clusters linked with the user profile have a similarity above a defined threshold, then the current user can be associated with the user profile. The threshold can be defined according to the type of similarity determination used. In an aspect, association of a current user with the user profile can be based on any combination of the bases mentioned in this paragraph.

Optionally, supplemental content can be presented to the current user based on the associated user profile. In an aspect, the supplemental content can be an advertisement, a commercial, suggested content, or the like. In an aspect, the supplemental content can be presented simultaneously with the content. In a further aspect, the supplemental content can be presented as an overlay in the content. In an aspect, the supplemental content can be presented in a different viewing area than a viewing area for the content. In an aspect, the supplemental content can be spliced together with the content. In an aspect, the supplemental content can be presented in a predetermined window. In an aspect, the supplemental content can be presented in real-time. In an aspect, the supplemental content can be available on demand.

Figure 8:
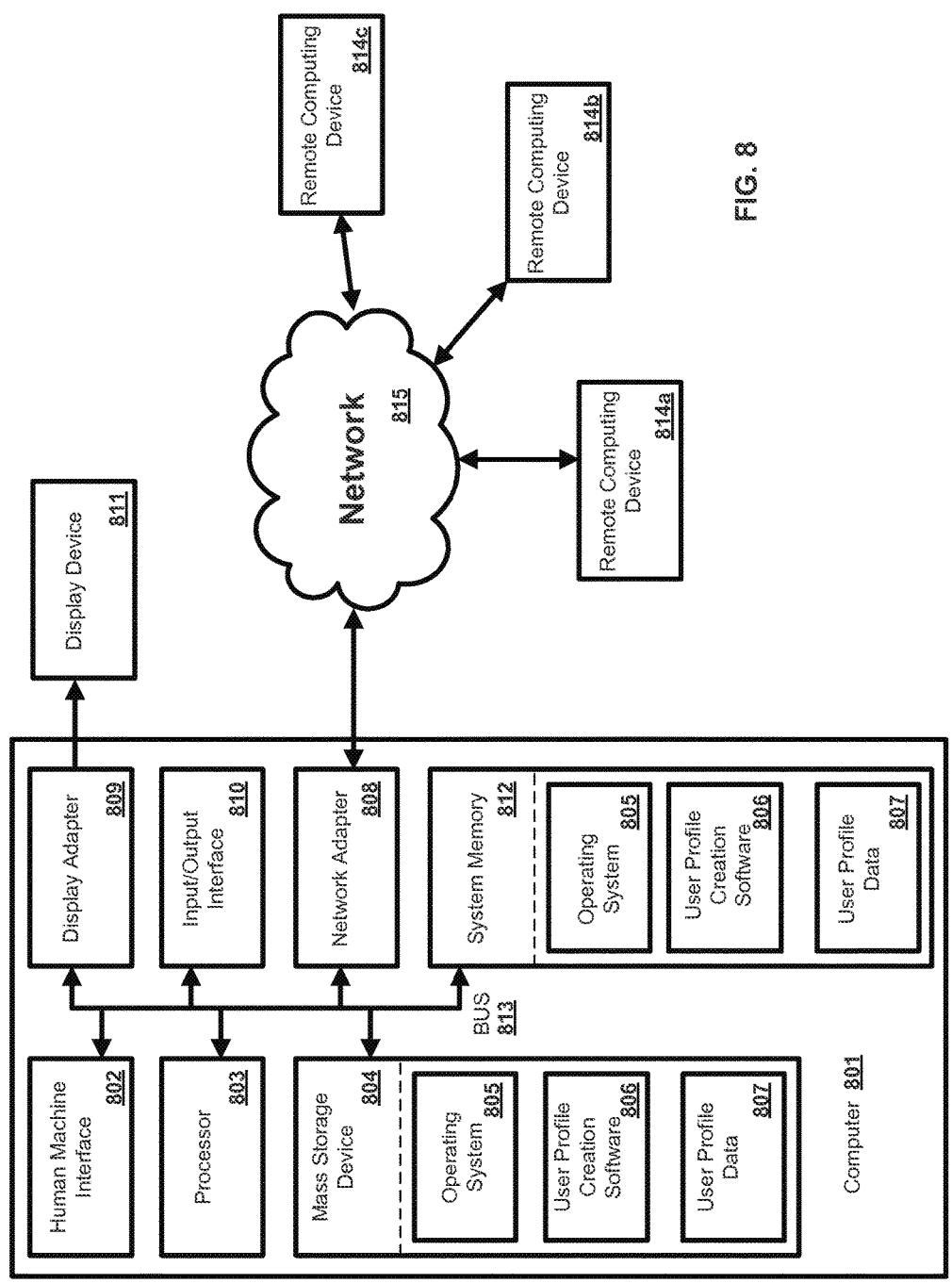
FIG. 8 illustrates an exemplary system.

In an exemplary aspect, the methods and systems can be implemented on a computer 801 as illustrated FIG. 8 and described below. By way of example, server 110 of FIG. 1 can be a computer as illustrated in FIG. 8. Similarly, the methods and systems disclosed can utilize one or more computers to perform one or more functions in one or more locations. FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors or processing units 803, a system memory 812, and a system bus 813 that couples various system components including the processor 803 to the system memory 812. In the case of multiple processing units 803, the system can utilize parallel computing.

The system bus 813 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a. Personal Computer Memory Card Industry Association (PCMCIA), Universal Serial Bus (USB) and the like. The bus 813, and all buses specified in this description can also be implemented over a wired or wireless network connection and each of the subsystems, including the processor 803, a mass storage device 804, an operating system 805, user profile creation software 806, user profile data 807, a network adapter 808, system memory 812, an Input/Output Interface 810, a display adapter 809, a display device 811, and a human machine interface 802, can be contained within one or more remote computing devices 814a, b, c at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as user profile data 807 and/or program modules such as operating system 805 and user profile creation software 806 that are immediately accessible to and/or are presently operated on by the processing unit 803.

In another aspect, the computer 801 can also comprise other removable/non-removable, volatile/non-volatile computer storage media. By way of example, FIG. 8 illustrates a mass storage device 804 which can provide non-volatile storage of computer code, computer readable instructions, data structures, program modules, and other data for the computer 801. For example and not meant to be limiting, a mass storage device 804 can be a hard disk, a removable magnetic disk, a removable optical disk, magnetic cassettes or other magnetic storage devices, flash memory cards. CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and user profile creation software 806. Each of the operating system 805 and user profile creation software 806 (or some combination thereof) can comprise elements of the programming and the user profile creation software 806. User profile data 807 can also be stored on the mass storage device 804. User profile data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 803 via a human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, a display device 811 can also be connected to the system bus 813 via an interface, such as a display adapter 809. It is contemplated that the computer 801 can have more than one display adapter 809 and the computer 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computer 801 via Input/Output Interface 810. Any step and/or result of the methods can be output in any form to an output device. Such output can be any form of visual representation, including, but not limited to, textual, graphical, animation, audio, tactile, and the like. The display 811 and computer 801 can be part of one device, or separate devices.

The computer 801 can operate in a networked environment using logical connections to one or more remote computing devices 814*a, b, c*. By way of example, a remote computing device can be a personal computer, portable computer, smartphone, a server, a router, a network computer, a peer device or other common network node, and so on. Logical connections between the computer 801 and a remote computing device 814*a, b, c* can be made via a network 815, such as a local area network (LAN) and/or a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing device 801, and are executed by the data processor(s) of the computer. An implementation of user profile creation software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining, based on at least a respective audio volume level associated with each content item of a plurality of content items accessed over a period of time, a first plurality of profile clusters and a plurality of user profiles, wherein the plurality of user profiles are based on linking two or more profile clusters of the first plurality of profile clusters;

determining that a content item is accessed by a user device at a current time window;

responsive to the user device accessing the content item at the current time window, determining, based on a respective audio volume level associated with each content item of a plurality content items accessed during a previous time window, a second plurality of profile clusters;

determining, based on attributes associated with each profile cluster of the first plurality of profile clusters and attributes associated with each profile cluster of the second plurality of profile clusters, a correlation between each profile cluster of the first plurality of profile clusters and each profile cluster of the second plurality of profile clusters; and causing, based on the correlation between a profile cluster of the first plurality of profile clusters and a profile cluster of the second plurality of profile clusters satisfying an audio volume level threshold that is based on a percentage of a maximum audio volume, an output of an indication of user specific content associated with a user profile of the plurality of user profiles, wherein the indication is presented as an overlay in the content item accessed at the current time window.

2. The method of claim 1, wherein audio volume level is determined based on attributes of audio volume associated with a content item accessed by a user device.

3. The method of claim 1, wherein determining the first plurality of profile clusters comprises K-means clustering of the respective audio volume levels associated with each content item of the plurality of content items accessed over the period of time according to one or more threshold audio volume levels.

4. The method of claim 1, wherein the indication of user specific content is output in real-time.

5. The method of claim 1, wherein the indication of user specific content is output within a predetermined time window.

6. The method of claim 1, wherein the user specific content is stored and available on demand.

7. The method of claim 1, wherein the attributes associated with each profile cluster of the first plurality of profile clusters and the attributes associated with each profile cluster of the second plurality of profile clusters comprise one or more of: a channel, a program, a program day of the week displayed, a program time of day displayed, or a program parental rating.

8. The method of claim 1, wherein the attributes associated with each profile cluster of the first plurality of profile clusters and the attributes associated with each profile cluster of the second plurality of profile clusters comprise one or more of a channel change rate, or a pressure applied when a user-engageable element is engaged.

9. The method of claim 1, wherein determining the second plurality of profile clusters comprises K-means clustering of the respective audio volume levels associated with each content item of the plurality of content items accessed during the previous time window according to one or more threshold audio volume levels.

10. A method, comprising:

updating, based at least on an audio volume change associated with at least one content item of a plurality of content items accessed over a period of time, a first plurality of profile clusters comprising the plurality of content items, wherein the first plurality of profile clusters comprises respective audio volume levels associated with each content item of the plurality of content items;

updating, based on the updated first plurality of profile clusters, a plurality of user profiles, wherein the plurality of user profiles are based on linking two or more profile clusters of the first plurality of profile clusters;

determining a content item accessed at a current time window;

determining, based on a respective audio volume level associated with each content item of a plurality content items accessed during a previous time window, a second plurality of profile clusters;

determining, based on attributes associated with each profile cluster of the first plurality of profile clusters and attributes associated with each profile cluster of the second plurality of profile clusters, a correlation between each profile cluster of the first plurality of profile clusters and each profile cluster of the second plurality of profile clusters; and causing, based on the correlation between a profile cluster of the first plurality of profile clusters and a profile cluster of the second plurality of profile clusters satisfying an audio volume level threshold that is based on a percentage of a maximum audio volume, an output of an indication of user specific content associated with a user profile of the plurality of user profiles, wherein the indication is presented as an overlay in the content item accessed at the current time window.

11. The method of claim 10, wherein each respective audio volume level associated with each content item of the plurality of content items accessed over the period of time is determined by monitoring attributes associated with an access of each content item of the plurality of content items accessed over the period of time further comprising determining, based on linking two or more profile clusters of the first plurality of profile clusters, a plurality of user profiles.

12. The method of claim 10, wherein determining the first plurality of profile clusters comprises K-means clustering of the respective audio volume levels associated with each content item of the plurality of content items accessed over the period of time according to one or more threshold audio volume levels.

13. The method of claim 10, wherein the indication of user specific content is output in real-time.

14. The method of claim 10, wherein the user specific content is stored and available on demand.

15. The method of claim 10, wherein the attributes associated with-each profile cluster of the first plurality of profile clusters and the attributes associated with each profile cluster of the second plurality of profile clusters comprise one or more of: a channel, a program, a program day of the week displayed, a program time of day displayed, or a program parental rating.

16. The method of claim 10, wherein the attributes associated with each profile cluster of the first plurality of profile clusters and the attributes associated with each profile cluster of the second plurality of profile clusters comprise one or more of a channel change rate, or a pressure applied when a user-engageable element is engaged.

17. A method, comprising:

determining, based at least on linking, each audio volume level of a plurality of audio volume levels associated with first content presented to a plurality of users via a user device with a threshold audio level of a plurality of threshold audio levels, a plurality of profile clusters;

determining, based on linking attributes associated with two or more of the profile clusters, a plurality of user profiles;

determining that second content is accessed by the user device at a current time window;

determining, based on a plurality of audio volume levels associated with third content accessed during a previous time window and the plurality of threshold audio levels, another plurality of profile clusters;

determining that audio volumes associated with a user profile of the plurality of user profiles and audio volumes associated with a profile cluster of the another plurality of profile clusters satisfy an audio volume level threshold that is based on a percentage of a maximum audio volume; and causing, based on the satisfied audio volume level threshold, an output of an indication of user specific content associated with the user profile, wherein the indication is presented as an overlay in at least a portion of the second content.

18. The method of claim 17, wherein determining the plurality of profile clusters comprises K-means clustering.

19. The method of claim 17, wherein attributes associated with the user profile and attributes associated with the profile cluster of the another plurality of profile clusters comprise one or more of a channel, a program, a program day of the week displayed, a program time of day displayed, or a program parental rating.

20. The method of claim 17, wherein attributes associated with the user profile and attributes associated with the profile cluster of the another plurality of profile clusters comprise one or more of comprise one or more of a channel change rate, or a pressure applied when a user-engageable element is engaged.

21. A system comprising, comprising:
a computing device configured to:
determine, based at least on linking, each audio volume level of a plurality of audio volume levels associated with first content presented to a plurality of users via a user device with a threshold audio level of a plurality of threshold audio levels, a plurality of profile clusters, determine, based on linking attributes associated with two or more of the profile clusters, a plurality of user profiles;

determine that second content is accessed by the user device at a current time window, determine, based on a plurality of audio volume levels associated with third content accessed during a previous time window and the plurality of threshold audio levels, another plurality of profile clusters;

determine that audio volumes associated with a user profile of the plurality of user profiles and audio volumes associated with a profile cluster of the another plurality of profile clusters satisfy an audio volume level threshold that is based on a percentage of a maximum audio volume, and send, based on the satisfied audio volume level threshold, an indication of user specific content associated with the user profile; and the user device configured to:
access, the first content, the second content and the third content, present the first content, the second content and the third content, receive the indication of user specific content, and cause an output of the indication of the user specific content, wherein the indication is presented as an overlay in at least a portion of the second content.

22. The system of claim 21, wherein the computing device is configured to determine the plurality of profile clusters based at least on K-means clustering.

23. The system of claim 21, wherein attributes associated with the user profile and attributes associated with the profile cluster of the another plurality of profile clusters comprise one or more of a channel, a program, a program day of the week displayed, a program time of day displayed, or a program parental rating.

24. The system of claim 21, wherein attributes associated with the user profile and attributes associated with the profile cluster of the another plurality of profile clusters comprise one or more of comprise one or more of a channel change rate, or a pressure applied when a user-engageable element is engaged.

* * * * *